United States Patent
Choi

(10) Patent No.: US 9,338,779 B2
(45) Date of Patent: May 10, 2016

(54) APPARATUS AND METHODS FOR TRANSMISSION AND RECEPTION OF DATA IN MULTI-ANTENNA SYSTEMS

(71) Applicant: APPLE INC., Cupertino, CA (US)

(72) Inventor: Hyung-Nam Choi, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/270,058

(22) Filed: May 5, 2014

(65) Prior Publication Data

US 2014/0321439 A1    Oct. 30, 2014

Related U.S. Application Data

(63) Continuation of application No. 13/442,769, filed on Apr. 9, 2012, now Pat. No. 8,717,998, which is a continuation of application No. 12/150,485, filed on Apr. 28, 2008, now Pat. No. 8,155,063.

(51) Int. Cl.
*H04W 72/04* (2009.01)
*H04B 7/04* (2006.01)
*H04L 5/00* (2006.01)

(52) U.S. Cl.
CPC ......... *H04W 72/0446* (2013.01); *H04B 7/0413* (2013.01); *H04L 5/0023* (2013.01); *H04L 5/0032* (2013.01); *H04L 5/0064* (2013.01); *H04L 5/0092* (2013.01); *H04B 7/04* (2013.01); *H04L 5/0037* (2013.01)

(58) Field of Classification Search
CPC ... H04L 5/0023; H04L 5/0092; H04L 5/0032; H04L 5/0064; H04L 5/0037; H04W 72/0446; H04B 7/04; H04B 7/0413
USPC ......................................................... 370/336
See application file for complete search history.

(56) References Cited

U.S. PATENT DOCUMENTS

| | | | |
|---|---|---|---|
| 6,466,976 B1 * | 10/2002 | Alles et al. ................... 709/224 |
| 2003/0210750 A1 * | 11/2003 | Onggosanusi et al. ....... 375/295 |
| 2003/0221008 A1 * | 11/2003 | England .............. H04L 12/5695 |
| | | | 709/226 |
| 2006/0003784 A1 * | 1/2006 | Chion et al. .................. 455/518 |
| 2007/0270173 A1 * | 11/2007 | Niu et al. ...................... 455/522 |
| 2008/0063115 A1 * | 3/2008 | Varadarajan et al. ......... 375/299 |
| 2009/0042617 A1 * | 2/2009 | Li et al. ...................... 455/562.1 |

* cited by examiner

*Primary Examiner* — Brian D Nguyen
(74) *Attorney, Agent, or Firm* — Fay Kaplun & Marcin, LLP

(57) ABSTRACT

Methods and apparatus adapted to address asymmetric conditions in a multi-antenna system. In one embodiment, the multi-antenna system comprises a wireless (e.g., 3G cellular) multiple-input, multiple-output (MIMO) system, and the methods and apparatus efficiently utilize transmitter and receiver resources based at least in part on a detected asymmetric condition. If an asymmetric condition is detected by the transmitter on any given data stream, the transmitter can decide to utilize only a subset of the available resources for that stream. Accordingly, the signal processing resources for that data stream are adapted to mirror the reduction in resources that are necessary for transmission. The transmitter signals the receiver that it will only be using a subset of the resources available, and the receiver adapts its operation according to the signaling data it receives. The multi-antenna system can therefore reduce power consumption as well as increasing spectral efficiency on the network.

16 Claims, 15 Drawing Sheets

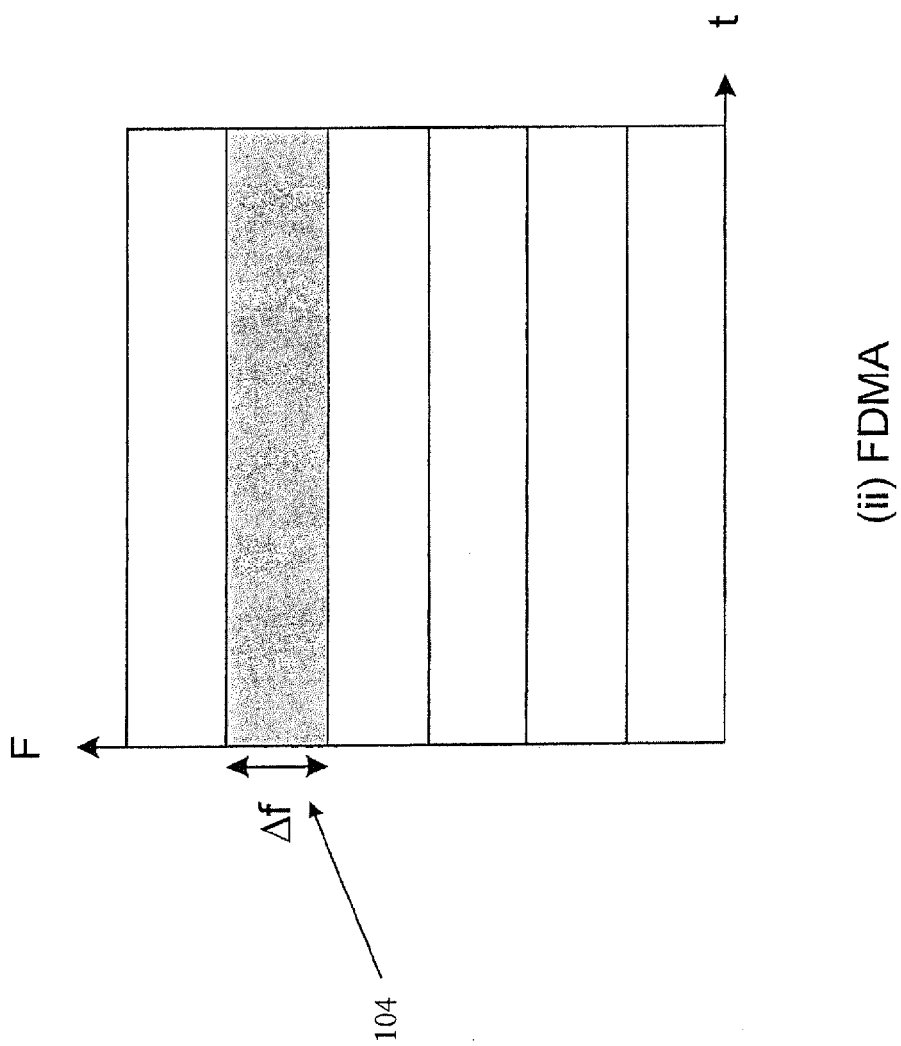

(iii) CDMA

APPARATUS AND METHODS FOR TRANSMISSION AND RECEPTION OF DATA IN MULTI-ANTENNA SYSTEMS

CROSS REFERENCE TO RELATED APPLICATIONS

This Application is a continuation of U.S. patent application Ser. No. 13/442,769, issued on May 6, 2014 as U.S. Pat. No. 8,717,998, which is a continuation of U.S. patent application Ser. No. 12/150,485, issued on Apr. 10, 2012 as U.S. Pat. No. 8,155,063.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to the efficient allocation of time-frequency resources of a wireless communications system using multiple antennas, including the asymmetric distribution of data streams among the antennas.

2. Description of Related Technology

Basic Multiple Access Methods

FIGS. 1A-1D illustrate basic multiple access methods well understood in the wireless transmission arts. In these FIGS., time increases in the direction of a time axis t and frequency increases in the direction of a frequency axis F.

FIG. 1A comprises a first time-frequency diagram illustrating a TDMA (time division multiple access) system. In TDMA, each mobile radio terminal may use the whole frequency band provided for the usage by the mobile radio terminals but for each mobile radio device only a predefined transmission time interval (TTI) is allocated in which the mobile radio device may send and receive useful data. During a transmission time interval 102 only one mobile radio device is active in a radio cell. In TDMA the number of users that the network can support is equal to the number of TTIs that are available.

FIG. 1B comprises a second time-frequency diagram illustrating a FDMA (frequency division multiple access) system. In FDMA, each mobile radio device may use the whole time period but only a predefined narrow frequency band 104 of the whole frequency band available for sending and receiving useful data. In the narrow frequency band only one mobile radio device is active in the radio cell at any given time. In FDMA, the number of users that the network can support is equal to the number of frequency bands which are available throughout a given frequency spectrum.

FIG. 1C comprises a third time-frequency diagram illustrating a CDMA (code division multiple access) system. In CDMA, each mobile radio terminal may send and receive useful data during the whole time period and using the whole frequency band. In order to avoid interference between the data sent by different senders, each mobile radio device is allocated a binary code pattern 108. The code patterns which are allocated to the different mobile radio terminals are ideally orthogonal and data sent by a mobile radio terminal or to be received by the mobile radio terminal is coded ("spread") by the code pattern allocated to the mobile radio terminal. In CDMA, the number of users that the network can support is directly related to the number of orthogonal spreading codes which are available. In certain modes of CDMA operation, variable data rates may be supported by assigning various length spreading codes (a high data rate stream requires a shorter length spreading code, which also limits the number of orthogonal codes available to other users). CDMA has the property that the higher the number of users on the network, the more likely the users will interfere with one another. Accordingly, code distribution and power control are critical.

FIG. 1D illustrates OFDMA (orthogonal frequency division multiple access), which is a special case of FDMA and is a multiple carrier method in which the whole frequency band having a bandwidth B is subdivided into M orthogonal sub carriers 110. Thus, there are M (narrow) frequency bands with a bandwidth of F=B/M. In OFDMA, a data stream to be sent is divided on a multiplicity of sub carriers and is transmitted in parallel. The data rate of each sub carrier is accordingly lower than the overall data rate. For each mobile radio terminal, a defined number of subcarriers are allocated for data transmission. For OFDMA the number of maximum users that the network can support is the multiple of the orthogonal sub-carriers multiplied by the number of available transmission time intervals. A chief advantage of OFDMA's flexible time-frequency resource allocation, over e.g., CDMA's flexible code allocation, is a higher spectral efficiency.

UMTS

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

In the current UMTS mobile radio communication standard, also called Release 7, a maximum net peak transmission rate of 28.8 Mbps is supported in the downlink transmission direction, while a rate of 11.52 Mbps is supported in the uplink transmission direction. The uplink transmission direction in the present context denotes signal transmission from the mobile radio communication terminal to the respective UMTS base station. The downlink transmission direction denotes signal transmission from the respective associated UMTS base station to the mobile radio communication terminal. Radio transmission technologies currently specified for these channels are Frequency Division Duplex (FDD) and Time Division Duplex (TDD). The multiple access method used in such systems is based on Code Division Multiple Access (CDMA) technology, a Elan of direct sequence spread spectrum (DSSS).

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in future, namely to speeds on the order of 100 Mbps in the downlink transmission direction and 50 Mbps in the uplink transmission direction. To improve transmission over the air interface to meet these increased transmission rates, new techniques have been specified.

MIMO (Multiple Input-Multiple Output) is one of the important techniques in LTE. MIMO is an antenna technology in which multiple antennas (up to 4 antennas as an exemplary configuration) are used at both the NodeB (base station in LTE) and UE (mobile radio communication terminal) sides. See e.g., U.S. Pat. No. 5,345,599 to Paulraj, et al. issued Sep. 6, 1994 entitled "Increasing capacity in wireless broadcast systems using distributed transmission/directional reception (DTDR)" which describes one such MIMO technology.

With MIMO, multiple independent data streams can be transmitted in parallel using the same time-frequency resource. To distinguish the data streams sharing this same time-frequency resource, spatial division multiplexing is applied. However, there is one significant issue with MIMO when the amount of data to be transmitted on the independent data streams differs significantly. In this case, the shared time-frequency resource will be inefficiently used by the data stream with the smaller amount of data utilization.

An exemplary MIMO implementation is illustrated at FIG. 2. Specifically, FIG. 2 illustrates a high-level MIMO transmission structure according to LTE that includes two independent data streams (Data Stream 1 202, Data Stream 2 204), and two antennas (Ant 1 206, Ant 2 208) at the transmitter side 210 and receiver side 212, respectively. At the transmitter side, the data symbols of each data stream are passed to the OFDM (Orthogonal frequency division multiplex) modulator, where they are modulated onto the orthogonal subcarriers. The block of output samples from the OFDM modulator make up a single OFDM symbol. This time-domain signal is then transmitted over the transmit antenna across the Mobile Radio Channel (MRC 1, MRC 2). At the receiver an OFDM demodulator is used to process the received signal and bring it into the frequency-domain (i.e., via Fast Fourier Transform or FFT operation, discussed below). Ideally, the output of the OFDM demodulator will be the original symbols that were passed to the OFDM modulator at the transmitter.

In practice, the transmitter and receiver of LTE devices can be realized using Inverse Fast Fourier Transform (IFFT)/Fast Fourier Transform (FFT) digital signal processing. In one embodiment, the OFDM modulator is implemented by IFFT operation and the OFDM demodulator is implemented by FFT operation. An exemplary implementation for a non-MIMO case is depicted in FIG. 3. The data stream 302, consisting of N data symbols m(i), is passed to the IFFT 306 after serial/parallel conversion (S/P) 304. There, the data symbols are modulated onto the orthogonal subcarriers. The block of output samples from the IFFT make up a single OFDM symbol s(i) after a parallel/serial conversion (P/S) 308. This time-domain signal is then transmitted over the transmit antenna across the mobile radio channel (air interface). At the receiver, the samples of the received OFDM symbol r(i) are passed to the FFT 312 after serial/parallel conversion 310. Ideally, the output of the FFT n(i) 314, will be the original symbols that were passed to the IFFT 306 at the transmitter.

While FIG. 3 illustrates a transmitter and a receiver diagram of a single antenna in an LTE system, for the multiple antenna case, the FFT and IFFT would simply be replicated. As the FFT/IFFT overhead scales in discrete increments with each additional antenna, FFT and IFFT hardware implementations quickly become expensive in terms of power consumption. Other hardware costs such as gate count and die size are generally fixed at fabrication. In software implementations, the FFT and IFFT operations are largely repetitive, cycle-intensive, and in many communication applications, time constrained. Consequently, MIMO operation offers great benefits in data transmission; yet requires expensive tradeoffs whether implemented in hardware and/or software.

Furthermore, while MIMO theory typically assumes a symmetric data rate across multiple antenna paths, this is not an absolute or "guaranteed" condition in actual implementation. Therefore, where a system experiences asymmetric antenna usage, the benefits of MIMO operation may be outweighed by the additional cost(s) of supporting the additional antenna(s).

Many different MIMO solutions are evidenced in the prior art. For example, WIPO Publication No. 2005/060123 to Larsson et al. published Jun. 30, 2005 and entitled "METHOD AND APPARATUS IN A MIMO BASED COMMUNICATION SYSTEM" discloses communication in a MIMO network that is optimized by selecting a first set of users comprising at least one user, selecting a second set of users not comprised in the first set, adapting communication parameters for the first set of users according to a first principle suitable, e.g. SVD, adapting communication parameters for the second set of users according to a second principle, e.g. opportunistic MIMO, and transmitting to the first set of user terminals according to the first communication parameters and to the second set of user terminals according to the second communication parameters. In this way, communication with one or a few users can be optimized while network resources can be used in an efficient way also for other users.

For LTE, new multiple access methods have been specified. For the downlink transmission direction, OFDMA (Orthogonal Frequency Division Multiple Access) in combination with TDMA (Time Division Multiple Access) has been specified. Uplink data transmission is based on SC-FDMA (Single Carrier Frequency Division Multiple Access) in combination with TDMA. As previously discussed, the complexity in terms of signal processing at the transmitter and receiver side is significantly impacted, especially where the amount of data to be transmitted on the independent data streams significantly differs.

In a process generally referred to as precoding, knowledge of a transmission channel (as well as channel state) can allow the transmitter to use multiple antennas constructively. An exemplary usage would be multiple identical transmissions that constructively interfere at the destination. For example, U.S. Patent Publication No. 20050254461 to Shin, et al. published Nov. 17, 2005 and entitled "Apparatus and method for data transmission/reception using channel state information in wireless communication system" discloses a method for transmitting and receiving data according to a channel state in a wireless communication system, the method includes measuring a characteristic of transmission channels used for data transmission and transmitting channel state information of the measured channel characteristic; and selecting sub-channels for data transmission according to the channel state information, and transmitting data through the selected sub-channels.

Another process generally referred to as diversity utilizes the spatial orthogonality of multiple identical transmissions to enable more robust data transmission across noisy channels. In another usage having sufficiently different spatial signatures, completely separate data streams can be transmitted. This process is generally referred to as spatial division multiplexing and allows multiple parallel channels to be transmitted essentially without employing additional time-frequency resources.

Other solutions have also been contemplated in the prior art for implementing LTE systems in a 3GPP network. For example, United States Patent Publication No. 20070258427 to Shaheen; et al. published Nov. 8, 2007 and entitled "WIRELESS COMMUNICATION METHOD AND SYSTEM FOR ACTIVATING MULTIPLE SERVICE BEARERS VIA EFFICIENT PACKET DATA PROTOCOL CONTEXT ACTIVATION PROCEDURES" discloses a method and apparatus for executing attachment procedures in a long term evolution (LTE) system to accommodate a single tunnel approach. Third Generation Partnership Program (3GPP) packet data protocol (PDP) context activation procedures are used for the allocation of an Internet protocol (IP) address and the establishment of tunneling between an evolved Node-B (eNodeB) and an anchor node, while allowing multiple radio access bearers (RABs) to be mapped to one PDP context for different quality of service (QoS) requirements. Thus, one PDP context is sufficient for a wireless transmit/receive unit (WTRU) within a single packet data network (PDN). Multiple PDP contexts can be established for special requirements, (e.g., bundled services), or when the WTRU connects to multiple PDNs.

United States Patent Publication No. 20080013553 to Shaheen published Jan. 17, 2008 and entitled "ACTIVATION OF MULTIPLE BEARER SERVICES IN A LONG TERM EVOLUTION SYSTEM" discloses a method of activating multiple bearer services in a long term evolution (LTE) wireless communication system including multiple bearers. At least one of the multiple bearers is activated during initial attach procedures which combine an attach procedure with activate packet data protocol (PDP) context activation procedures. In one embodiment, LTE attach procedures are implemented for multi-bearer services activation that establishes an LTE direct general packet radio service (GPRS) tunneling protocol (GTP) tunnel or normal GTP two-tunnels operation. In another embodiment, the initial attach procedures are used to activate a default PDP context to be followed by modified PDP context activation procedures for multi-bearer services activation. These procedures can be used to establish a modified LTE direct GTP tunnel or a normal GTP two-tunnels operation.

United States Patent Publication No. 20080045272 to Wang; et al. published Feb. 21, 2008 and entitled "DYNAMIC RESOURCE ALLOCATION, SCHEDULING AND SIGNALING FOR VARIABLE DATA RATE SERVICE IN LTE" discloses a method and apparatus are provided for dynamic resource allocation, scheduling and signaling for variable data real time services (RTS) in long term evolution (LTE) systems. Preferably, changes in data rate for uplink RTS traffic are reported to an evolved Node B (eNB) by a UE using layer 1, 2 or 3 signaling. The eNB dynamically allocates physical resources in response to a change in data rate by adding or removing radio blocks currently assigned to the data flow, and the eNB signals the new resource assignment to the UE. In an alternate embodiment, tables stored at the eNB and the UE describe mappings of RTS data rates to physical resources under certain channel conditions, such that the UE uses the table to locally assign physical resources according to changes in UL data rates. Additionally, a method and apparatus for high level configuration of RTS data flows is also presented. However, the disclosure is related to the adaption of resources for UL transmissions only; i.e., the number of resources to be used by transmitter (UE) is controlled by receiver (NodeB), and is directed to non-MIMO systems.

Despite the foregoing, improved methods and apparatus for reception and transmission of data through multi-antenna systems, such as an LTE system, are needed. Prior art MIMO systems are deficient in that they are not able to specify and/or change resource allocation to the transceiver(s) (e.g. a subset of time-frequency resources) for an asymmetrically loaded antenna. Allowing the ability to specify and/or change resource allocation to the transceiver(s) would be advantageous in that the transceiver(s) can greatly simplify its modulation and demodulation operations (e.g. FFT, IFFT) for the lighter loaded antenna, resulting in more efficient operation. Ideally, such improved apparatus and methods would also optionally permit the ability to multiplex another signal onto the newly unallocated time-frequency resources. Consequently, these improved apparatus and methods would greatly improve both operation cost (e.g. power consumption), as well as spectral efficiency for asymmetrically loaded MIMO systems.

SUMMARY OF THE INVENTION

The present invention satisfies the aforementioned needs by providing improved apparatus and methods for data transmission in multi-antenna systems.

In one aspect of the invention, a method for optimizing at least one resource associated with a multi-antenna transmission system is disclosed. In one embodiment, the system comprises a transmitter, a receiver, and a plurality of data streams, each of said plurality of data streams comprising a resource, and the method comprises: detecting an asymmetric condition in one of the plurality of data streams; allocating a subset of the resource for at least one of the plurality of data streams; and transmitting a message to the receiver, the message comprising information indicative of the subset of the resource.

In one variant, the system comprises a 3G cellular system, and the transmitter comprises a base station, and the receiver comprises a substantially portable user device.

In another variant, the system comprises a 3G cellular system, the receiver comprises a base station, and the transmitter comprises a substantially portable user device. The system includes a plurality of antennas comprising a multi-input, multi-output (MIMO) system; e.g., four (4) antennas.

In yet another variant, the system is capable of a net transmission rate of approximately 100 Mbps from the base station to the user device, and approximately 50 Mbps from the user device to the base station.

In a further variant, the transmitter is adapted to transmit at least one of the streams using orthogonal frequency division multiplexing (OFDM), and the resource comprises a time-frequency resource.

In still another variant, the resource comprises a Fast Fourier Transform (FFT) or Inverse Fast Fourier Transform (IFFT) processing resource.

In a second aspect of the invention, an apparatus for optimizing resources in a multi-antenna transmission system is disclosed. In one embodiment, the apparatus comprises: a processing device; a plurality of transmitting antennas; and a storage device in signal communication with the processing device, the storage device comprising a computer program having a plurality of instructions. When executed by the processing device, the instructions: detect an asymmetric condition in one of a plurality of data streams to be transmitted over the plurality of transmitting antennas, each of the plurality of data streams comprising a time-frequency resource; allocate a subset of the resource of at least one of the plurality of data streams for one of the plurality of transmitting antennas; and generate a message to be transmitted over at least one of the plurality of transmitting antennas, the message comprising information indicative of the allocation of the subset of the resource.

In one variant, the apparatus comprises a base station within a cellular system.

In another variant, the apparatus comprises a mobile user device adapted for use within a cellular system, and the plurality of antennas comprises a multi-input, multi-output (MIMO) system having e.g., four (4) antennas.

In a third aspect of the invention, a computer readable apparatus having a storage medium is disclosed. In one embodiment, the medium is adapted to store a computer program comprising instructions which, when executed: detect an asymmetric condition in one of a plurality of data streams to be transmitted over a plurality of transmitting antennas, each of the plurality of data streams having a default resource allocation associated therewith; change the default allocation so as to reallocate a subset of the resource of at least one of the plurality of data streams; and generate a message to be transmitted over at least one of the plurality of transmitting antennas, the message comprising information indicative of the reallocation of the subset of the resource.

In a fourth aspect of the invention, a multi-antenna transmission system comprising a base station and a user device is disclosed. In one embodiment, the base station and the user device are capable of communicating via a plurality of data streams, the multi-antenna transmission system operating according to the method comprising: detecting an asymmetric condition in one of the plurality of data streams on the base station, each of the plurality of data streams comprising a default resource; allocating a subset of the default resource for at least one of the plurality of data streams; and transmitting a signaling message to the user device, the signaling message comprising information indicative of the allocation subset of the default resource.

In a fifth aspect of the invention, a method of operating a transmitting device within a wireless system is disclosed. In one embodiment, the method provides at least one of reduced power consumption and increased spectral efficiency, the transmitting device having a plurality of antennas, and comprises: receiving a plurality of data input streams; identifying a data rate asymmetry between at least two of the input streams; and reallocating time-frequency resources based at least in part on the identified data rate asymmetry. The reallocation of the resources substantially provides the at least one of reduced power consumption and increased spectral efficiency as compared to an allocation of the resources before the reallocation.

In a sixth aspect of the invention, apparatus for use in a wireless communications network is disclosed. In one embodiment, the apparatus is adapted to: determine the amount of data to be transmitted for an upcoming transmission period for a first data stream and a second data stream, the amount of data for the second stream being less than the amount of data for the first stream at least during the period; determine a first number of subcarriers needed to carry the data of the first stream during the period; determine a second number of subcarriers needed to carry the data of the second stream during the period, the second number being a subset of the first number; use the first number of the subcarriers for transmission of the first stream; and use the second number of subcarriers for transmission of the second data stream.

In one variant, the first and second subcarriers are part of an orthogonal frequency division multiplexing (OFDM) processing unit.

In another variant, the first and second numbers of subcarriers are part of respective orthogonal frequency division multiplexing (OFDM) processing units. Use of the second number of subcarriers comprises passing modulation symbols to only a subset of a total number of inputs on an Inverse Fast Fourier Transform (IFFT) process, while the remainder of the total number of inputs remain unused.

In another variant, the apparatus is further adapted to signal to a single user device in wireless communication with the apparatus that the first data stream is to use the first number of subcarriers, and the second data stream is to use the second number of subcarriers.

Alternatively, the apparatus is further adapted to signal to a first user device in wireless communication with the apparatus that the first data stream is to use the first number of subcarriers, and to signal to a second user device in wireless communication with the apparatus that the second data stream is to use the second number of subcarriers. The signaling to the first and second user devices may further identify the specific subcarriers to be used for each of the first and second data streams, respectively.

In still another variant, the apparatus comprises a base station.

In a seventh aspect of the invention, a method of doing business within a wireless network having a plurality of subscribers is disclosed. In one embodiment, the method comprises: providing a first subset of the subscribers with first user devices having a first time-frequency resource allocation scheme, the first user devices having associated therewith a first fee or cost; and providing a second subset of the subscribers with second user devices having a second time-frequency resource allocation scheme, the second user devices having associated therewith a second fee or cost, the second fee or cost.

In one variant, the second fee or cost is greater than the first fee or cost, and the second user devices are more battery power-efficient than the first user devices, the greater battery power-efficiency being related at least in part to the second time-frequency resource allocation scheme. For example, the second time-frequency resource allocation scheme may comprise: determining an asymmetry in the time-frequency resource requirements of two data streams to be transmitted by one of the second user devices; and allocating subcarriers within an OFDM modulator so as to avoid unnecessary use of at least some of the subcarriers and processing resources associated therewith.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 1B is an exemplary chart of a Frequency Division Multiple Access (FDMA) implementation as a function of frequency and time.

DETAILED DESCRIPTION OF THE INVENTION

Figure 1A:
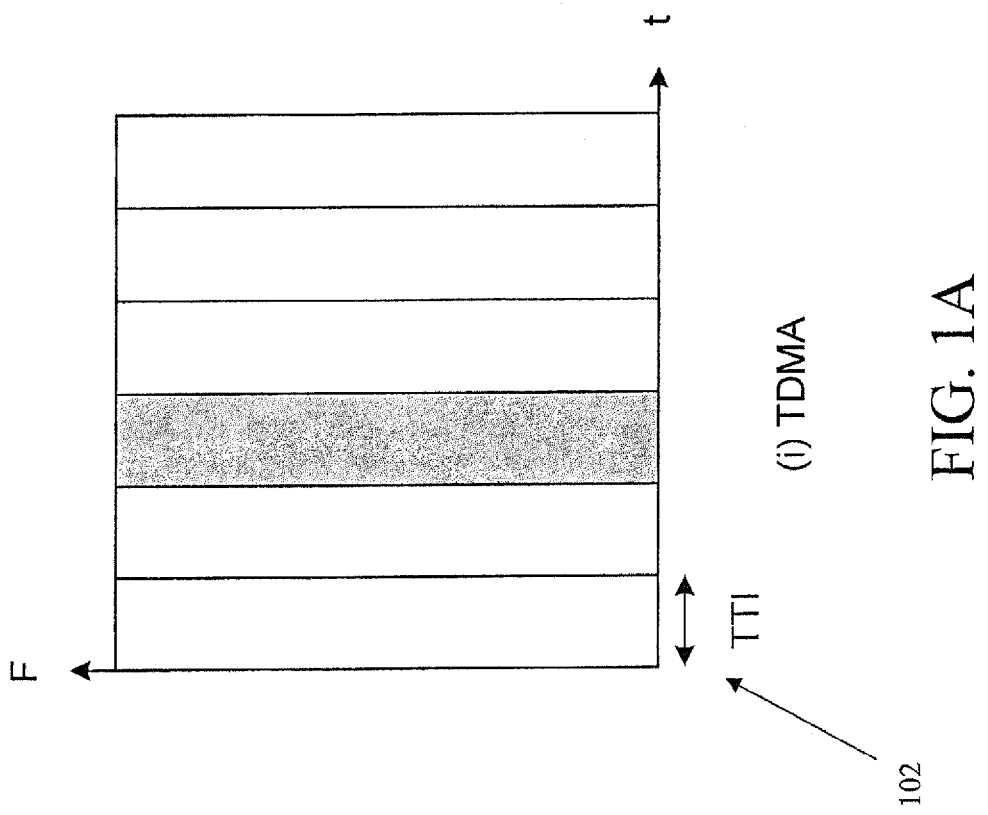
FIG. 1A is an exemplary chart of a Time Division Multiple Access (TDMA) implementation as a function of frequency and time.
Figure 1C:
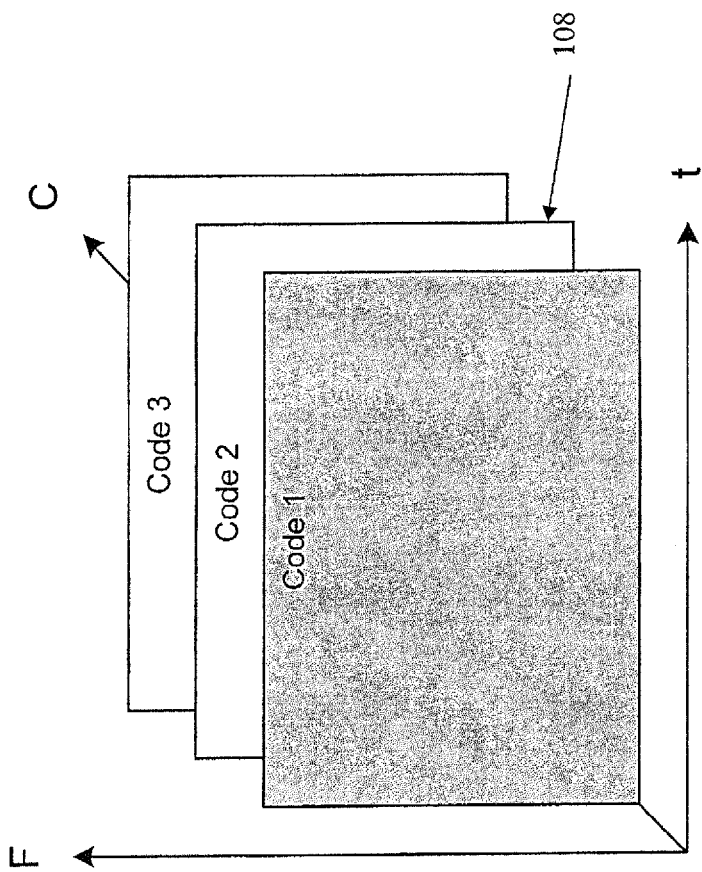
FIG. 1C is an exemplary chart of a Code Division Multiple Access (CDMA) implementation as a function of frequency and time.

As used herein, the terms "client device", "end user device" and "UE" include, but are not limited to cellular telephones, smartphones (such as for example an iPhone™) personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), IrDA or other wireless families.

As used herein, the term "wireless" means any wireless signal, data, communication, or other interface including without limitation Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, nanowband/FDMA, OFDM, PCS/DCS, analog cellular, CDPD, satellite systems, millimeter wave or microwave systems, acoustic, and infrared (i.e., IrDA).

Overview

The present invention discloses inter alia methods and apparatus for providing optimized performance for transceivers in multiple antenna systems. In one exemplary implementation, the multiple antenna system is a Multiple In-Multiple Out (MIMO) system as specified in the 3GPP Long Term Evolution (LTE) specification. Current implementations assume that transmission resources in a MIMO system are substantially symmetric with respect to one another. While assuming symmetric transmission simplifies the operation of the LTE system, in practice MIMO LTE systems often operate in conditions where the antennas transmit and receive asymmetrically loaded data streams.

In one exemplary aspect, the invention addresses these asymmetric conditions through efficient utilization of transmitter and receiver resources. If an asymmetric condition is detected by the transmitter on any given data stream, the transmitter can decide to utilize only a subset of the available time-frequency resources for that given data stream. Accordingly, the signal processing resources for that data stream are adapted to mirror the reduction in time-frequency resources that are necessary. The transmitter will then signal to the receiver that it will only be using a subset of the time-frequency resources, and the receiver will adapt its operation and process the received data in accordance with the signaling sent by the transmitter. By utilizing only a subset of the time-frequency resources as needed, the transmitter in an LTE MIMO system can reduce its power consumption, as well as its spectral efficiency on the network.

Detailed Description of Exemplary Embodiments

Exemplary embodiments of the present invention are now described in detail. While these embodiments are primarily discussed in the context of multi-antenna systems in a 3GPP LTE system, it will be recognized by those of ordinary skill that the present invention is in no way so limited. In fact, the principles of the present invention may readily be applied to multi-antenna systems in other wireless systems such as, for example, those compliant with the 3GPP2 initiative and standards, or IEEE 802.16 (WiMAX) systems.

Furthermore, while FFT/IFFT processing operations are primarily contemplated as the signal processing technique for the transmission schemes described herein, it will be appreciated that other suitable digital signal processing techniques can readily be substituted.

Figure 4:
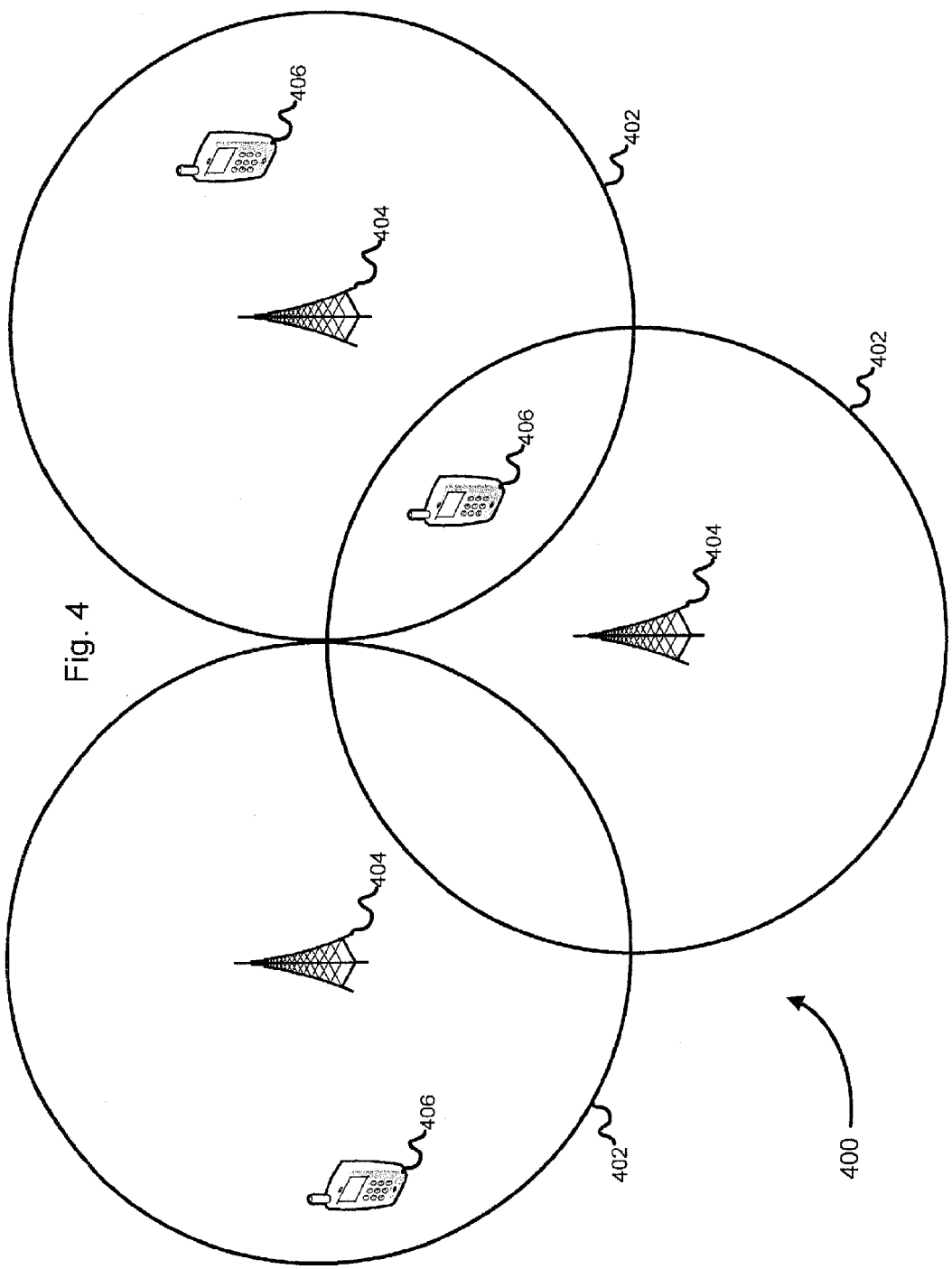
FIG. 4 is a functional block diagram illustrating an exemplary cellular network system utilized in accordance with the principles of the present invention.

FIG. 4 illustrates an exemplary cellular radio system 400 according to the invention. The system 400 comprises a network of radio cells 402 each served by a transmitting station 404, known as a cell site or base station. The radio network provides wireless communications service for a plurality of transceivers 406 (in most cases mobile User Equipment (UE)). The network of base stations 404 working in collaboration allows for wireless service which is greater than the radio coverage provided by a single serving base station 404. The individual base stations 404 are connected by another network (a wired or wireless network (not shown)), which includes additional controllers such as MSCs and the like for resource management, and in some cases access to other network systems (e.g., MANs, WANs, or internets such as the Internet). Cellular radio system network infrastructure is well known to one of ordinary skill in the art and, accordingly, is not further described herein.

In the context of a UMTS system, a base station 404 is referred to as "Node B". The UMTS Terrestrial Radio Access Network (UTRAN) is the collective aggregation of multiple Node Bs 404 along with the UMTS Radio Network Controllers (RNC). The user interfaces to the UTRAN via User Equipment (UE) 406 comprise an end user device such as a cellular telephone or smartphone.

Figure 5:
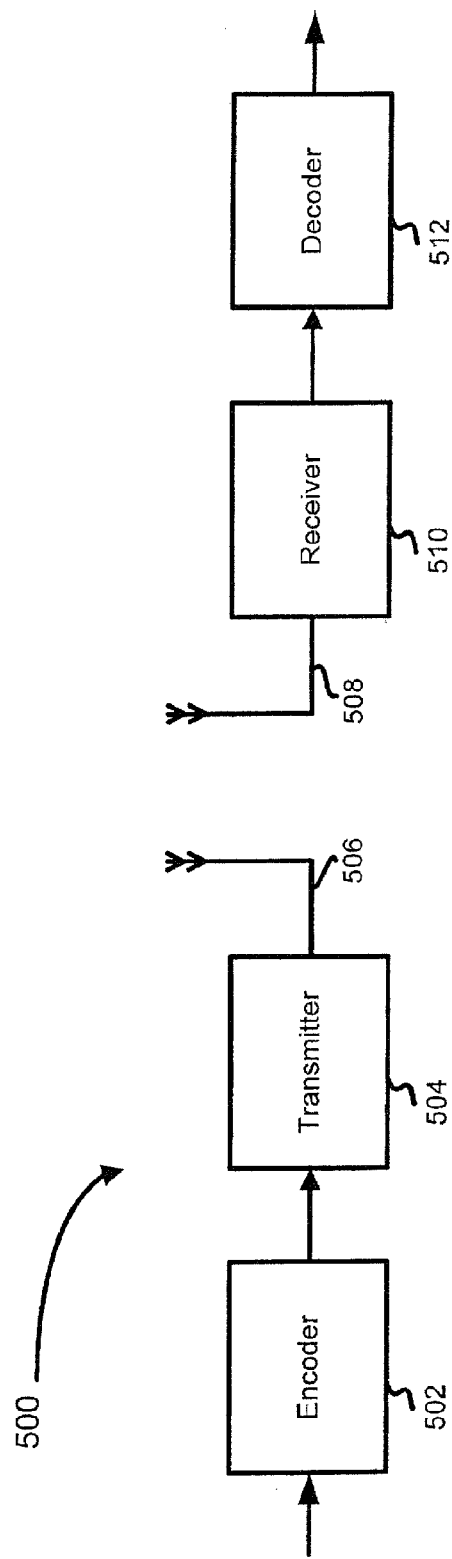
FIG. 5 is a first exemplary implementation of a digital communications system utilized in accordance with the principles of the present invention.

Referring now to FIG. 5, the operation of a simple digital communication system 500 is illustrated. As shown, an input signal (such as an analog voice signal from a UE user) is converted into a digital representation. This digital data stream may be compressed at an encoder 502 to reduce redundant or unnecessary information in a process collectively referred to as source coding. This may also be a "lossy" process; i.e., some of the original analog signal may be lost or not encoded in order to reduce channel bandwidth requirements. The compressed data stream is also coded using e.g., a forward error correction (FEC) technique such as turbo coding, Viterbi or LDPCs so as to be resistant to noise using a process referred to as channel coding. The channel coded output is passed to a transmitter 504, and transmitted across a noisy medium (i.e., air interface) via the antennas 506, 508. The receiver 510 receives an input data stream from the transmission medium, with an expected amount of corruption introduced by the noise. The received data is passed through a data correction process at a decoder 512 using the channel coding methods to correct for any transmission errors, typically to a prescribed maximum bit error rate (BER) such as 1E-08. Lastly, the corrected data stream is decompressed and decoded to produce a reproduction of the original signal input at the transmitter. In a UMTS-based system, the communication between Node B and UE includes both the uplink and downlink directions; i.e., both the Node B and the UE transmit and receive (although not necessarily simultaneously), and therefore both require complementary transceivers. Furthermore, in UMTS, the Node B will typically serve multiple UEs simultaneously, consequently the UTRAN must be able to support "multiple access" functionality.

LTE Network Architecture

Figure 6:
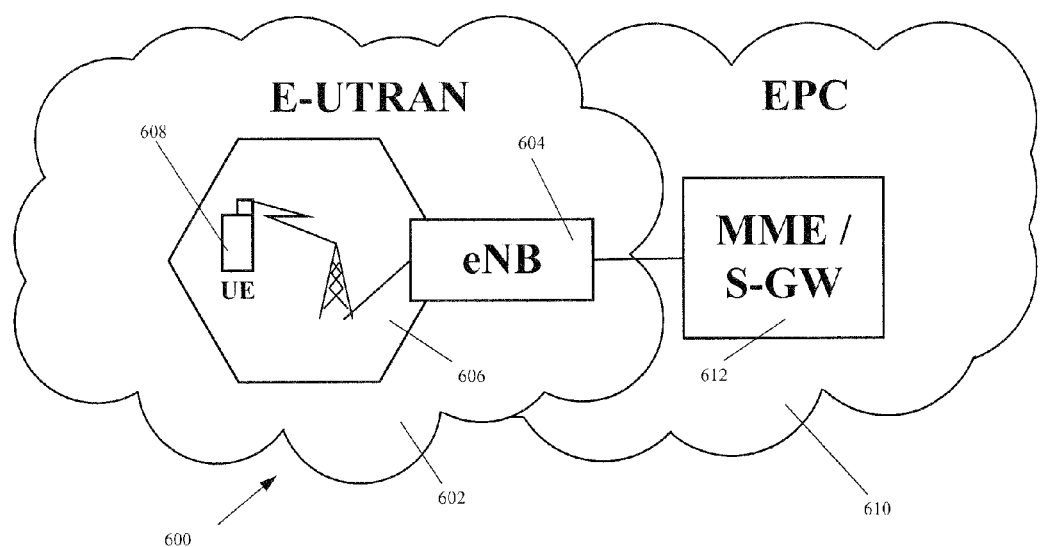
FIG. 6 is a functional block diagram illustrating an exemplary Long Term Evolution (LTE) network architecture utilized in accordance with the principles of the present invention.

FIG. 6 depicts the exemplary high-level network architecture 600 of an LTE system comprising a radio access network E-UTRAN 602 (Evolved UMTS Terrestrial Radio Access Network) and a core network EPC 610 (Evolved Packet Core). The E-UTRAN 602 consists of one or more base stations eNBs 604 (evolved Node B). Each eNB 604 provides radio coverage for one or more mobile radio cells 606 within E-UTRAN 602. Message signals or data signals are transmitted between a respective eNB 604 and a mobile station UE 608 in a mobile radio cell 606 over the air interface on the basis of a multiple access method. For LTE, new multiple access methods have been specified as previously noted. For the downlink transmission direction, OFDMA in combination with TDMA has been specified. OFDMA in combination with TDMA, subsequently referred to herein as OFDMA/TDMA, is a multi-carrier multiple access method in which a subscriber is provided with: (i) a defined number of subcarriers in the frequency spectrum; and (ii) a defined transmission time for the purpose of data transmission. Uplink data transmission is based on SC-FDMA (Single Carrier Frequency Division Multiple Access) in combination with TDMA.

The eNBs 604 are connected to the EPC 610, more specifically to the MME (Mobility Management Entity) and to the Serving Gateway (S-GW) 612. The MME 612 is responsible for controlling the mobility of UEs 608 located in the coverage area of the E-UTRAN 602, while the S-GW 612 is responsible for handling the transmission of user data between the UE 608 and the network. More details of radio access network and air interface are described in 3GPP TS 36.300 V8.1.0 (2007-06): "E-UTRA and E-UTRAN; Overall description; Stage 2", which is incorporated herein by reference in its entirety.

Figure 7:
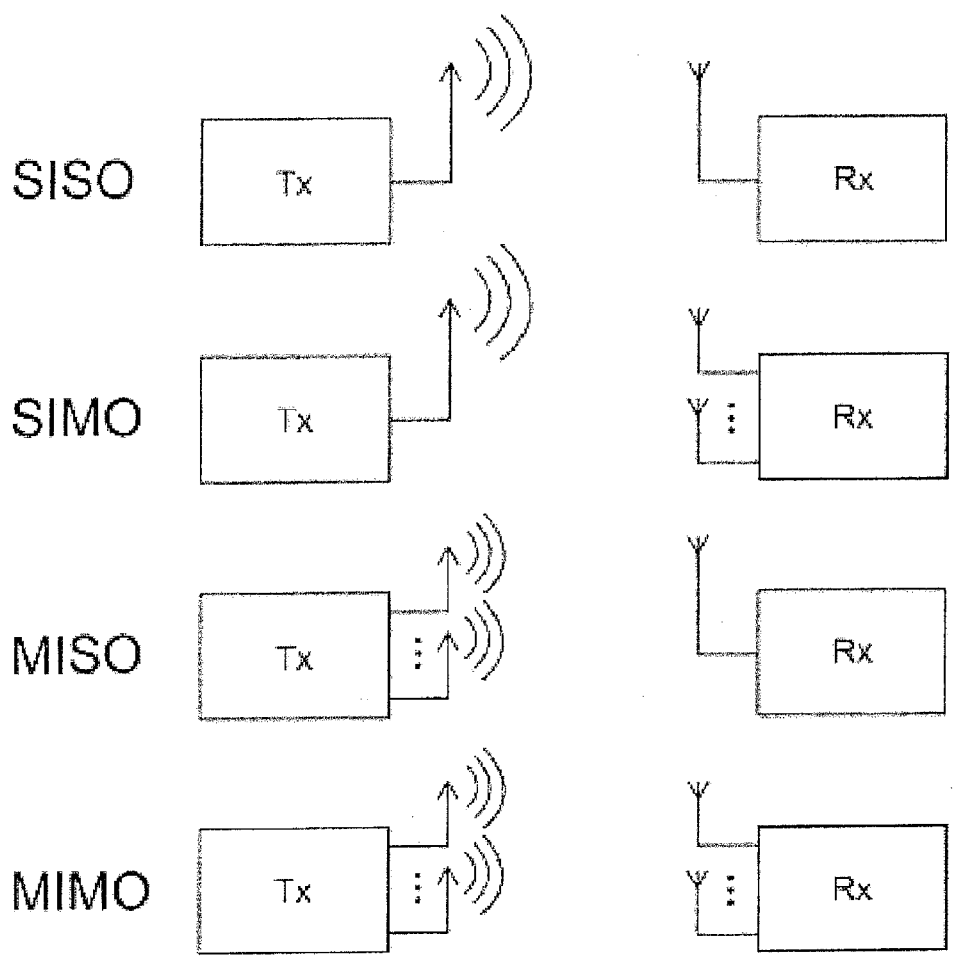
FIG. 7 is a functional block diagram illustrating a plurality of multiple antenna systems utilized in accordance with the principles of the present invention.

LTE specifies that MIMO operation must be supported for higher data rates. As previously discussed, MIMO operation uses multiple antennas to transmit and receive multiple data streams. FIG. 7 demonstrates the qualitative difference between SISO (Single In, Single Out), SIMO (Single In, Multiple Out), MISO (Multiple In, Single Out) and MIMO systems. While primarily discussed in the context of MIMO, the principles of the present invention could readily be adapted for MISO architectures in addition to MIMO architectures. Further, while described primarily in the context of multiple antenna systems that use a maximum number of four (4) antennas (i.e. up to four (4) antennas at the mobile side as well as up to four (4) antennas at the cell site as specified in LTE implementations), it is recognized that the principles of the present invention may equally be applied to systems incorporating more or less than the maximum number (4) specified in LTE implementations.

Moreover, it is also appreciated that the principles of the present invention could apply to anycast, broadcast, and multicast in addition to the unicast radio links primarily discussed herein.

Methods—

Figure 8:
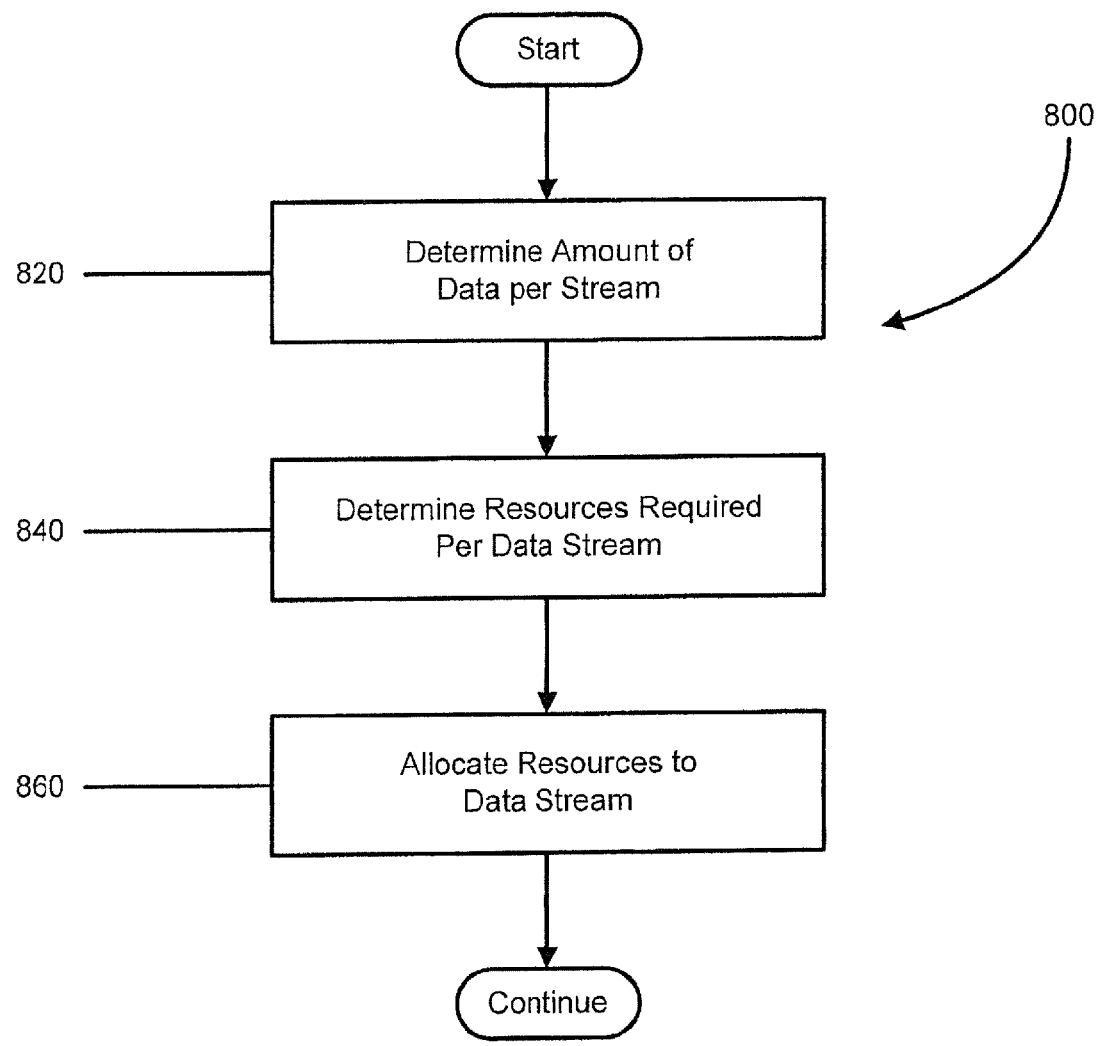
FIG. 8 is a logical flow diagram illustrating an exemplary embodiment of the generalized method for allocating resources to a data stream in accordance with the principles of the present invention.

Referring now to FIG. 8, an exemplary generalized method for allocating resources to one or more data streams 800 is illustrated.

At step 820 of FIG. 8, a transmitter in a digital communications system or other processing device in the transmission apparatus, determines the amount of data to be transmitted on each data stream for a given period of time. In the context of a multiple access implementation such as the OFDMA implementation shown and discussed with regards to FIG. 1D, the given period of time may comprise for example an upcoming transmission time instant such as a given OFDM symbol number, although other increments or bases may be used as well.

Figure 8A:
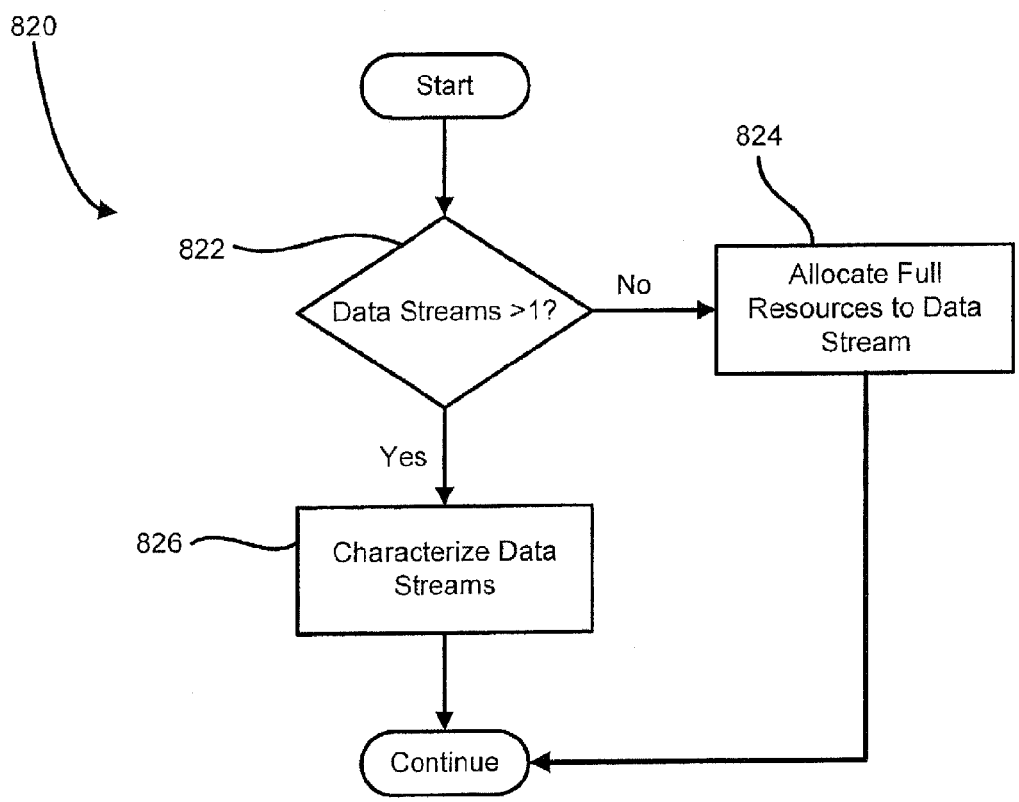
FIG. 8A is a logical flow diagram illustrating one implementation of a method for determining the amount of data per data stream per the method of FIG. 8.

In one exemplary implementation (FIG. 8A), the transmitter determines the number of data streams at step 822. If the number of data streams is equal to one, then full resources are allocated to that data stream at step 824. If the number of data streams is greater than one, the data streams are characterized at step 826. As there are a variety of reasons that the transmitter may determine that an asymmetric data stream is required over multiple antennas, characterizing the data streams (step 826) may be beneficial in understanding why asymmetry might exist. For example, asymmetric data stream requirements may arise due to any number of application specific requirements (e.g. video, voice, data), as well as environmental changes (e.g. fast fading), etc. Furthermore, asymmetry may arise if the transmitter determines that data streams should be throttled up or down, depending on any number of network parameters, including benefits, costs or operational requirements/considerations. These underlying conditions which lead to symmetric or asymmetric requirements can be effectively managed, in many instances, by understanding and characterizing the underlying data streams.

It will be appreciated that while primarily described in the context of multiple antennas transmitting multiple data streams, certain implementations of the foregoing methodology may use single data streams in a multiple antenna system. This might be the case for instance if the transmission apparatus comprises multiple antennas, but only needs a single antenna for a single data stream in a given implementation.

Referring back to FIG. 8, at step 840 the transmitter next determines the amount of resources required per data stream. In one embodiment, the transmitter determines the required amount of the common time-frequency-resources based on the amount of data to be transmitted on each data stream for the upcoming transmission time instant. In a variant of this first embodiment, the transmitter receives a data stream to be transmitted and the transmitter is not involved directly in data stream creation. In yet another embodiment, the transmitter can provide time-frequency resource feedback data to a software process (e.g. a higher-level software process) for purposes of maintaining antenna data stream symmetry. Yet other approaches will be recognized by those of ordinary skill provided the present disclosure.

Figure 8B:
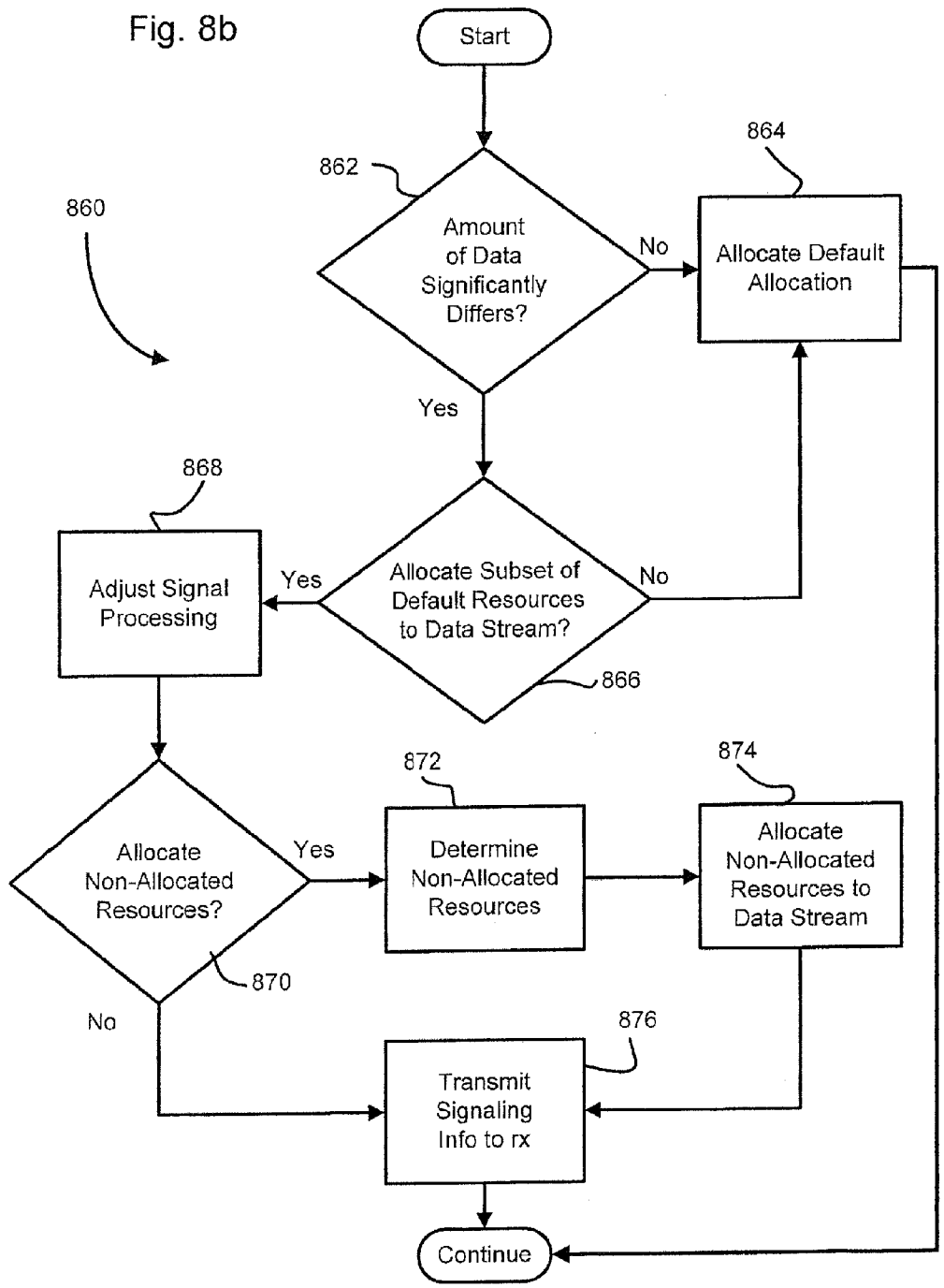
FIG. 8B is a logical flow diagram illustrating an exemplary implementation of allocating resources to a data stream per the method of FIG. 8.

At step 860 of FIG. 8, resources are allocated to one or more of the data streams based at least in part on the processing steps at step 820 and/or step 840. For example, FIG. 8B illustrates one exemplary methodology 860 for allocating resources to one or more data streams in accordance with the method of FIG. 8. At step 862 of FIG. 8B, the amount of data to be transmitted is analyzed on two or more of the data streams to see if the amounts significantly differ. The "significance" of this difference may be determined for example via comparison to a predetermined threshold, or using an algorithm which dynamically evaluates this quantity as a function of other system parameters. If there is no significant difference, then the default allocations are maintained at step 864. If there is a significant difference between the loadings of individual data streams, the transmitter can decide whether or not individual data streams should utilize a default resources value or, alternatively, only use a subset of the time-frequency resources (step 866). In one variant, the transmitter determines the subset of the time-frequency resources according to different criteria, e.g. on the basis of the best time-frequency resources in terms of quality, the sequence of time-frequency resources etc. In case of a relatively low amount of data on all streams, then in step 840 in FIG. 8, the transmitter would determine the number of required resources accordingly.

While utilizing a subset of the resources (such as time-frequency resources) is advantageous in many multiple antenna implementations, it is appreciated that it is not always in the best interests of the network to optimize the data streams. In fact, in certain situations it may be advantageous for the network to maintain an antenna data stream without modification. Furthermore, it is also appreciated that not all receivers may be equipped to modify their respective receive capabilities, and for these receivers, the additional complexity of implementing variations in allocated resources and antenna control may be detrimental to the overall operation of the system. Accordingly, at step 864, the default allocation of resources is maintained.

If the transmitter decides to use only a subset of the common time-frequency resources, the signal processing at the transmitter side will be adapted accordingly at step 868. For example, the signal processing resources might be adapted to efficiently utilize hardware resources to minimize power consumption based on the relative size of the subset allocation. It is appreciated that the signal processing sequence could be implemented in software, firmware and/or hardware, accordingly varying embodiments incorporating these elements as applicable are envisioned under the present invention.

Further, it is anticipated that while upper-layer software typically controls network and medium access usage, embodiments of the transmitter could be adapted to control network and medium access, as well for the express purpose of equalizing data stream loading, or conversely packing data streams more efficiently.

Other criteria used for allocating time-frequency resources (e.g. time shifted transmissions, trickle transmissions, low priority transmission, etc.) are also consistent with the invention described herein.

At step 870, it is determined whether or not to allocate the non-allocated resources from one of the data streams to another data stream. If this allocation is allowed, the available non-allocated resources are determined at step 872, and those non-allocated resources are then allocated to one or more different data streams (step 874). Further, the signal processing sequence could be unbalanced, such that either the transmitter or receiver may receive benefit when the resources of the other are allocated to a subset of the whole resource. For example, the transmitter might opt to adapt its operation in a manner which trades transmitter processing power for receiver processing power. This has advantages; e.g., in instances where large amounts of data are expected to be received at the receiver of a user device while relatively small amounts of transmitted data are expected.

At step 876, the subset of the resources to be used (e.g. time-frequency resources discussed previously) is signaled to the receiver. When the transmitter elects to modify its transmit operation, the receiver operation likewise benefits by modifying its receive operation. It is appreciated that while this signaling operation may be controlled by independent control signaling methods, other methods of control signaling are available as well such as e.g., embedded control, blind detection, etc. Once receiving the transmitted control signal, the receiver processes the received data for each data stream based on the signaling by the transmitter at step 876. The transmitted control signal is interpreted by the receiver and the receiver adjusts its receive apparatus accordingly.

One salient advantage of the approach as described above is that the common time-frequency resources can be efficiently used. For network operators, spectral efficiency improves profits. Higher spectral efficiency enables: (1) a greater number of serviced users; (2) better capital equipment distribution; and/or (3) provision of higher value services (such as data services). Existing technologies such as TDMA, FDMA and CDMA offer adaptive service, but offer limited strategies for incremental spectral usage. OFDMA offers more flexible usage of spectrum than CDMA, TDMA, or FDMA; however, the present invention further improves on the spectral efficiency of the OFDMA system.

Another significant advantage offered to currently existing OFDM technology by the present invention relates to the reduction of complexity of signal processing at the transmitter and receiver. The collaboration between transmitter and receiver previously described allows unnecessary computations to be eliminated from the communications link.

LTE Implementations—

Figure 2:
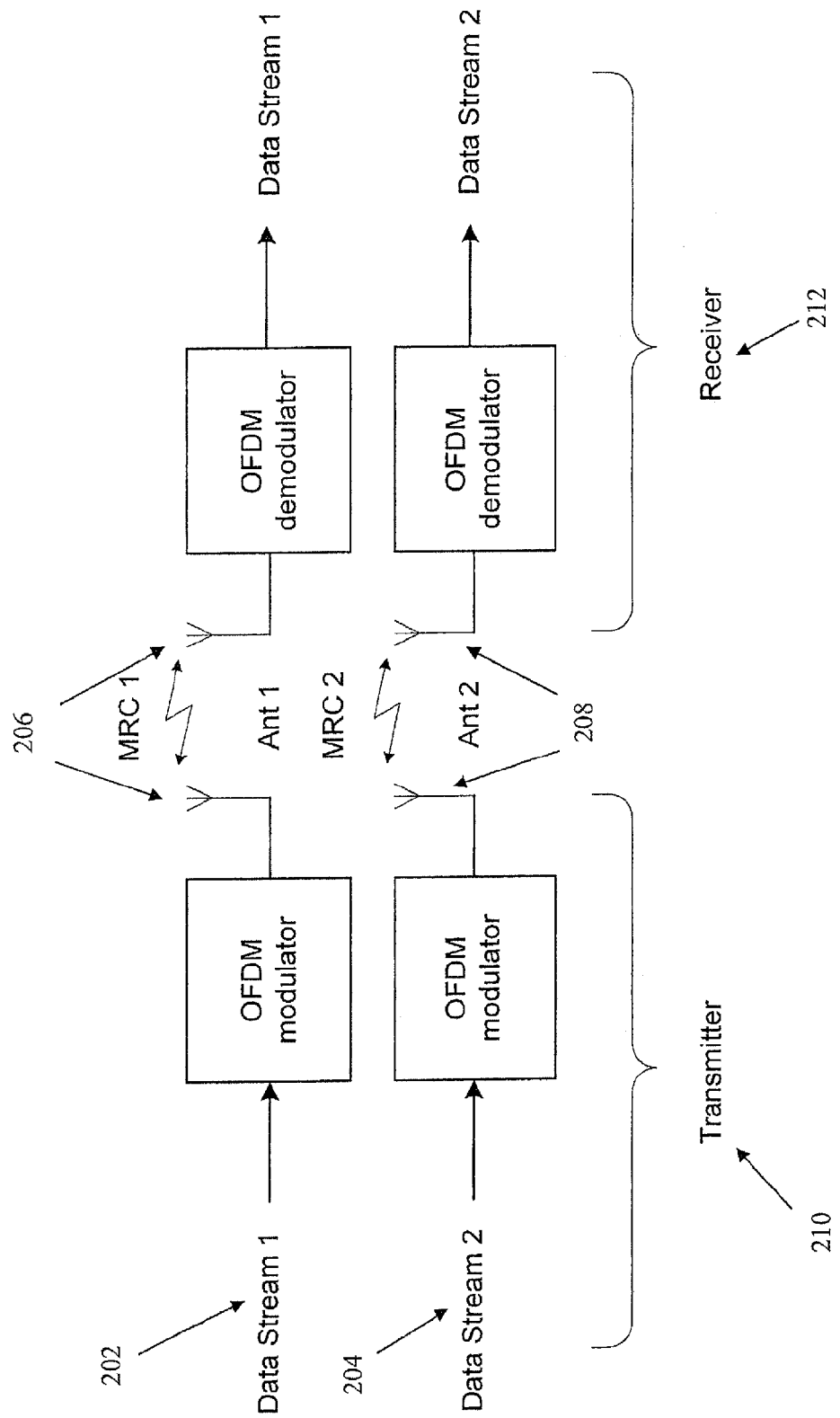
FIG. 2 is a functional block diagram illustrating an exemplary embodiment of a MIMO transmission structure in accordance with the principles of the present invention.
Figure 3:
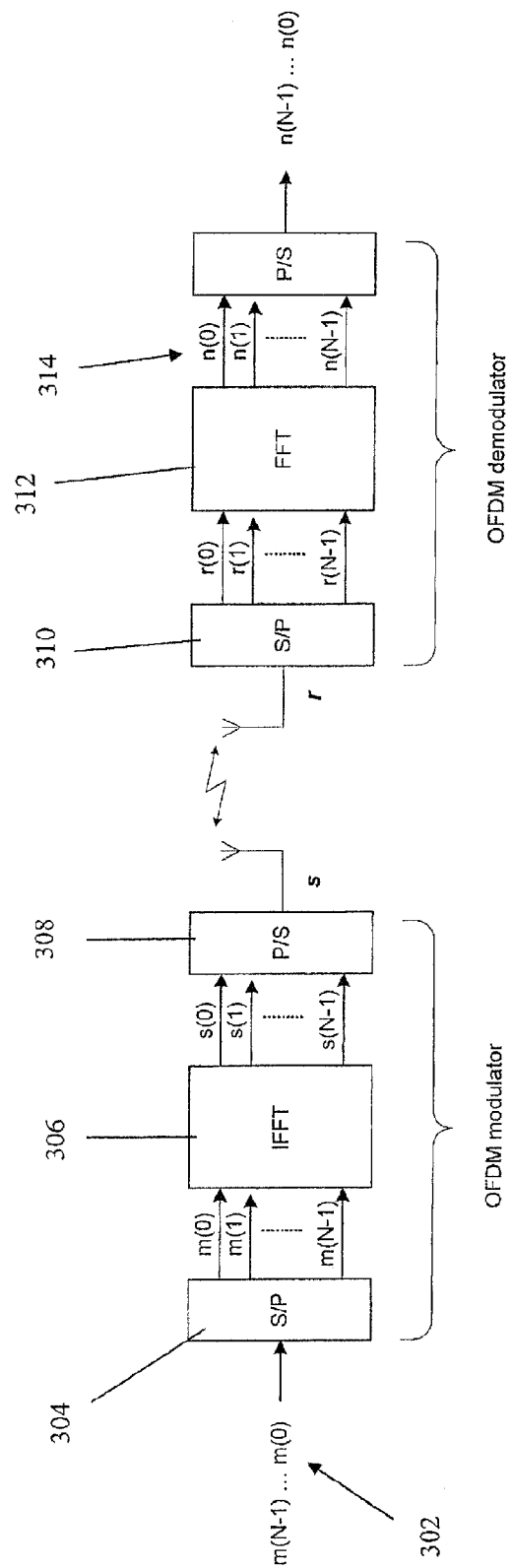
FIG. 3 is a functional block diagram illustrating an exemplary implementation of an OFDM modulator/demodulator through the use of an Inverse Fast Fourier Transform (IFFT) and a Fast Fourier Transform (FFT).

For the purposes of further explanation and illustration of the methods of FIGS. 8-8B, an exemplary LTE implementation with OFDMA/TDMA multiple access methods is now described. The radio transmission technology of this implementation is Frequency Division Duplex (FDD); i.e. the data transmission in the Downlink (DL) and Uplink (UL) are separated on different frequency bands. Furthermore, the DL MIMO transmission structure in operation is described according to e.g. that of FIG. 2, which has two independent data streams (Data Stream 1, Data Stream 2) and two (2) antennas (Ant 1, Ant 2). Other configurations of the foregoing may be used, however.

In an LTE system, the transmitter and receiver comprise a base station eNB and terminal UE (see FIG. 6). The data symbols of the data streams equal modulation symbols, e.g. 64QAM, 16QAM, QPSK. A time-frequency resource comprises 12 subcarriers per OFDM symbol. The present implementation also includes a frame structure, such as that described with respect to FIG. 1D, wherein one time slot of length 0.5 ms includes seven (7) OFDM symbols, and two (2) consecutive time slots are defined as a subframe.

Two MIMO modes are now described in the context of this specific network architecture: Single User MIMO (SU-MIMO) and Multiple User MIMO (MU-MIMO). In the case of SU-MIMO, the two independent data streams are allocated to one UE. In the case of MU-MIMO, each data stream is allocated to different UEs.

Furthermore, the data streams on the antennas are asymmetric in that the amount of data on each of the independent data streams differs from one another. This could result, for instance, due to data of different services multiplexed on the data streams. For example, data from a download service is multiplexed on Data Stream 1, while a VoIP service is multiplexed on Data Stream 2. In another exemplary case, the channel quality of the different data streams temporarily differs. Other such cases will be recognized by those of ordinary skill provided the present disclosure.

SU-MIMO—

In a first exemplary SU-MIMO case, the eNB 604 determines the amount of data to be transmitted on each data stream for the upcoming transmission time instant (i.e. OFDM symbol number #1) as follows: 96 information bits for Data Stream 1 and 24 information bits for Data Stream 2. With a channel coding rate of 1/3 and 64QAM modulation, this results in 48 data symbols for Data Stream 1 and, 12 data symbols for Data Stream 2.

Figure 1D:
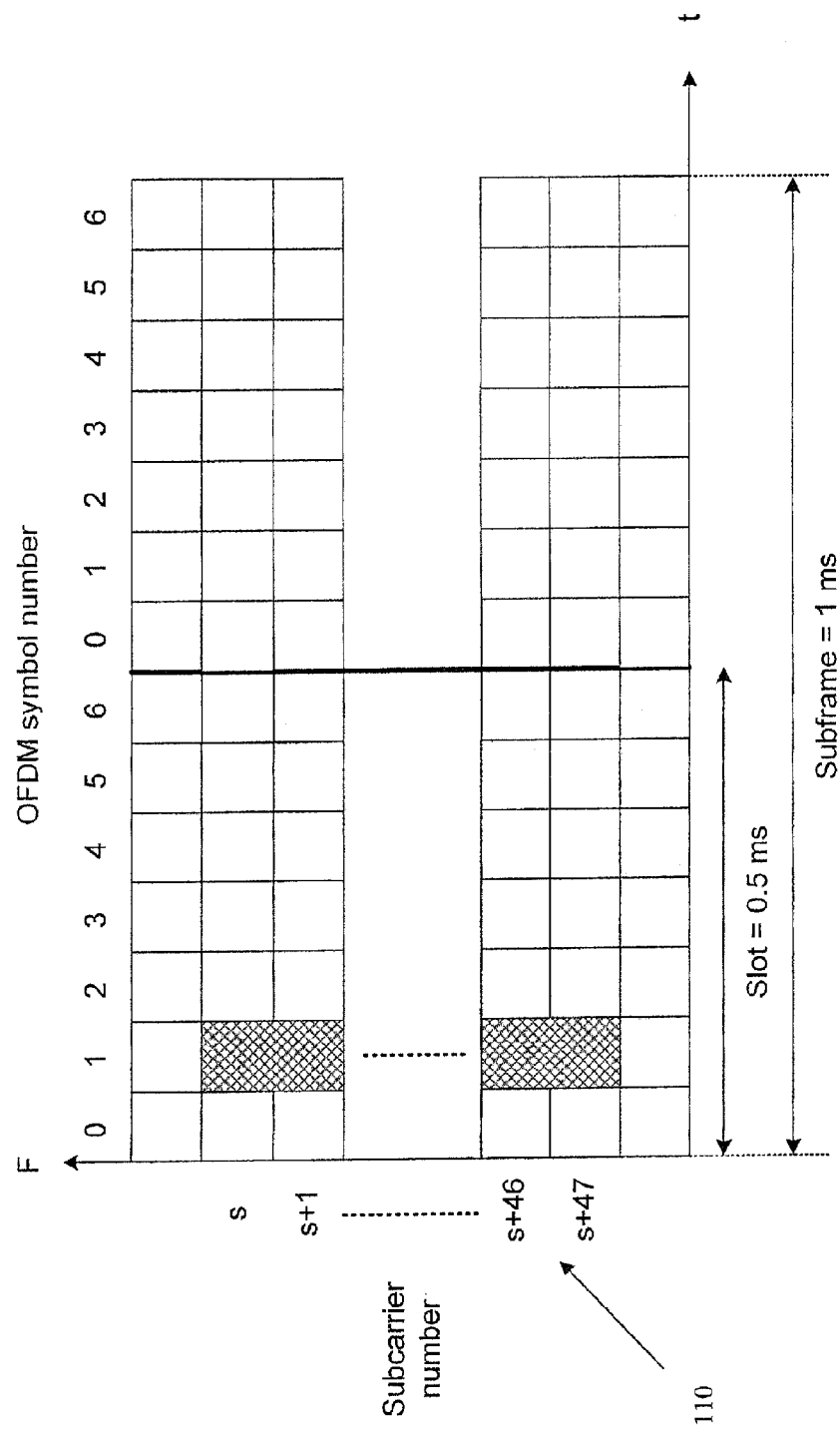
FIG. 1D is an exemplary chart of an Orthogonal Frequency-Division Multiple Access (OFDMA) implementation as a function of frequency and time.

The eNB 604 determines four (4) time-frequency resources as the required amount of the common time-frequency-resources based on the amount of data to be transmitted on Data Stream 1; i.e. 48 subcarriers (s to s+47) for OFDM symbol #1. In FIG. 1D, these time-frequency-resources are indicated by shading.

In a standard MIMO system, Data Stream 1 and Data Stream 2 would have been allocated symmetrically, and the time-frequency resources for Data Stream 2 would have been effectively wasted. Furthermore, the signal processing of Data Stream 2 using four (4) time-frequency resources is unnecessarily complex, in that it could have been accomplished in a simpler fashion. In the present embodiment, in order to reduce the signal processing complexity, the eNB 604 decides to use only a subset of the four (4) time-frequency resources for Data Stream 2, i.e. only one time-frequency resource.

Figure 9:
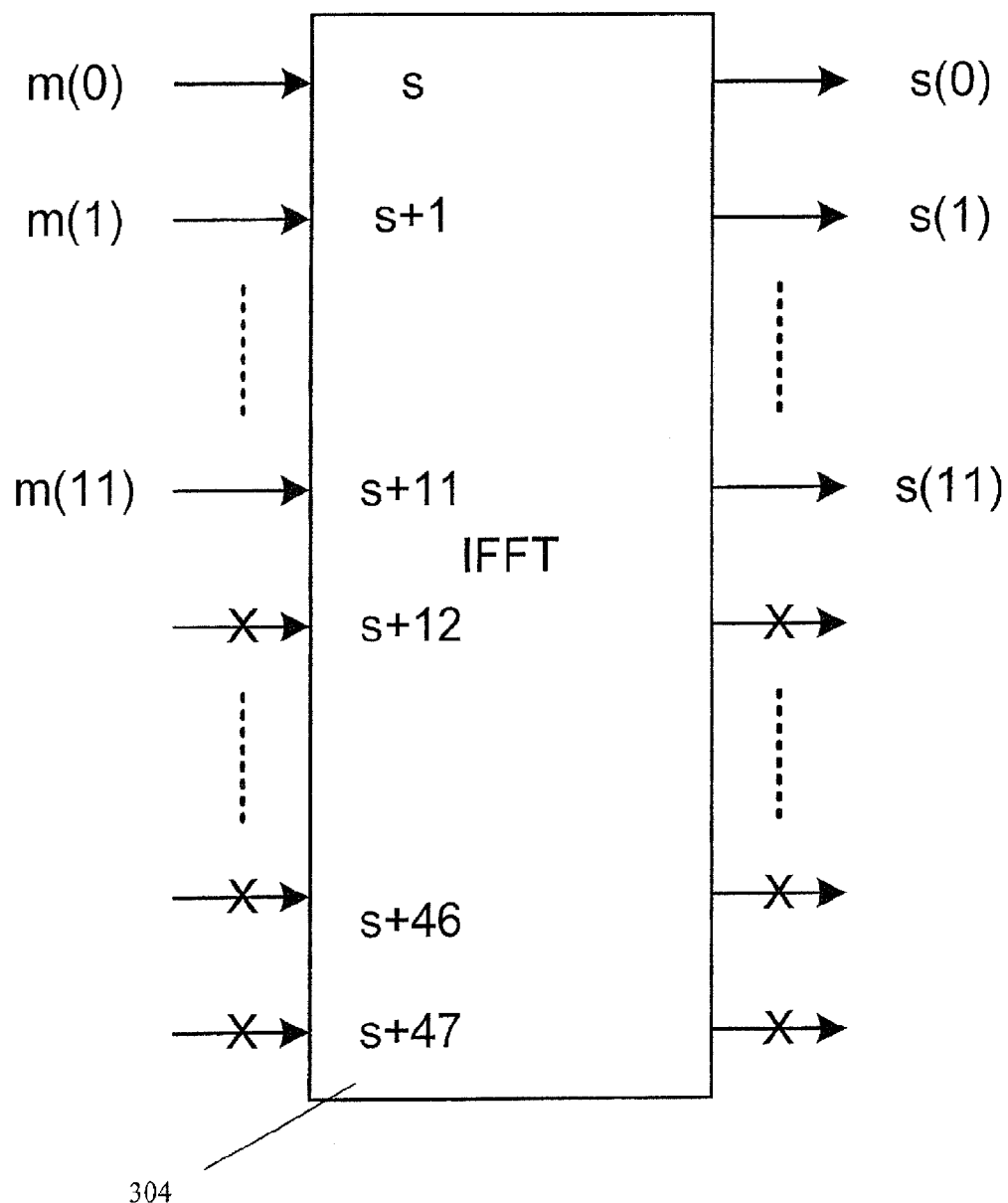
FIG. 9 is a functional block diagram illustrating a first exemplary embodiment of Inverse Fast Fourier Transform (IFFT) operation in accordance with the principles of the present invention.

As a consequence, the IFFT processing unit of the OFDM modulator for Data Stream 2 is adapted accordingly; i.e. only the twelve (12) subcarriers s to s+11 are used. In the IFFT processing unit of the OFDM modulator for Data Stream 2, the twelve (12) data modulation symbols m(0) to m(11) are passed to the IFFT processing unit and the remaining inputs remain unused (marked with an "X" in FIG. 9). The eNB signals the UE 608 for Data Stream 1 that all four (4) time-frequency-resources are used, whereas for Data Stream 2 only the subset of one time-frequency-resource is used. Due to the additional eNB transmit optimization decision, a small additional amount of control complexity is added, because the receiver must be notified of the time-frequency resources utilized by each antenna. In prior art MIMO systems, antenna symmetry is assumed. However, the additional complexity added by the present implementation of the invention is more than offset by its benefits (previously described).

The UE 608 processes the received data for each data stream based on the signaling from the eNB 604. The UE 608, having received control notification from the eNB 604, modifies the demodulation capability of its transceiver so as to accommodate the optimized data stream.

MU-MIMO—

In a first exemplary MU-MIMO case, the eNB 604 uses Data Stream 1 for transmitting data to a first UE 608 (UE No. 1) and Data Stream 2 for transmitting data to a second UE 608 (UE No. 2). The eNB 604 determines the amount of data to be transmitted on each data stream for the upcoming transmission time instant (i.e., OFDM symbol number No. 1) as follows: ninety-six (96) information bits for Data Stream 1 and twenty-four (24) information bits for Data Stream 2. With a channel coding rate 1/3 and 64QAM modulation, this results in forty-eight (48) data symbols for Data Stream 1 and twelve (12) data symbols for Data Stream 2.

The eNB 604 determines four (4) time-frequency resources as the required amount of the common time-frequency-resources based on the amount of data to be transmitted on Data Stream 1, i.e. forty-eight (48) subcarriers (s to s+47) for OFDM symbol #1. In FIG. 1D, again these time-frequency-resources are indicated by shading.

As described in the SU-MIMO case above, in a standard MIMO system, Data Stream 1 and Data Stream 2 would have been allocated symmetrically, and the signal processing of Data Stream 2 would be unnecessarily complex. In order to reduce the signal processing complexity in the present embodiment, the eNB 604 decides to use only a subset of the four (4) time-frequency resources for Data Stream 2; i.e., only one time-frequency resource.

As a consequence, the IFFT processing unit of the OFDM modulator for Data Stream 2 is again adapted accordingly; i.e. only the twelve (12) subcarriers s to s+11 are used. In the IFFT processing unit of the OFDM modulator for Data Stream 2, the twelve (12) data modulation symbols m(0) to m(11) are passed to the IFFT processing unit, and the remaining inputs remain unused (marked with an "X" in FIG. 9). The eNB 604 signals to UE No. 1 608 that for Data Stream 1, all four (4) time-frequency-resources are used. Correspondingly, the eNB 604 signals to UE No. 2 608 that for Data Stream 2 only a subset of the one time-frequency-resource is used. Similar to the SU-MIMO case described above, the additional eNB transmit optimization decision requires a small additional amount of control complexity to be added. In the MU-MIMO case, the additional control logic is only implemented by one of the plurality of users.

The mobile stations UE No. 1 608 and UE No. 2 608 process the received data based on the signaling by the eNB 604. The UEs 608 having received control notification from the eNB 604 modifies the demodulation capability of their transceivers so as to accommodate the optimized data stream.

In yet another MU-MIMO implementation, the eNB 604 uses Data Stream 1 for transmitting data to a first UE 608 (UE No. 1) and Data Stream 2 for transmitting data to a second UE (UE No. 2) 608. A third UE 608 (UE No. 3) is also serviced by the OFDMA network with Data Stream 3. The eNB 604 determines the amount of data to be transmitted on each Data Stream for the upcoming transmission time instant (i.e., OFDM symbol number No. 1) as follows: ninety-six (96) information bits for Data Stream 1 and twenty-four (24) information bits for Data Streams 2 and 3. With a channel coding rate of 1/3 and 64QAM modulation this results in forty-eight (48) data symbols for Data Stream 1 and twelve (12) data symbols for Data Streams 2 and 3.

The eNB 604 determines four (4) time-frequency resources as the required amount of the common time-frequency-resources based on the amount of data to be transmitted on Data Stream 1, i.e. forty-eight (48) subcarriers (s to s+47) for OFDM symbol No 1 (see FIG. 1D).

As described above, in order to reduce the signal processing complexity, the eNB 604 decides to use only a subset of the four (4) time-frequency resources for Data Stream 2; i.e. only one time-frequency resource. In the present context, this frees additional time-frequency resources that may be used to service Data Stream 3.

As a consequence, the IFFT processing unit of the OFDM modulator for Data Streams 2 and 3 are adapted accordingly; i.e. only the twelve (12) subcarriers s to s+11 are used for Data Stream 2, and subcarriers s+12 to s+23 are used for Data Stream 3. In the IFFT processing unit of the OFDM modulator for Data Stream 2, the twelve (12) data modulation symbols m(0) to m(11) are passed to the IFFT processing unit and the remaining inputs remain unused (marked with an "X" in FIG. 9); similarly, m(12) to m(23) are processed for Data Stream 3. The eNB 604 then signals UE No. 1 608 that for Data Stream 1, all four (4) time-frequency-resources are used. Correspondingly, the eNB 604 signals UE No. 2 608 and UE No. 3 608 that only the subset of one time-frequency-resource is used. Similar to the SU-MIMO case described above, the additional eNB transmit optimization decision requires a small additional amount of control complexity to be added. In this MU-MIMO embodiment, the additional control logic is implemented by a plurality of users.

The mobile stations UE No. 1 608, UE No. 2 608 and UE No. 3 608 process the received data based on the signaling from the eNB 604. The UEs 608, having received control notification from the eNB 604, modify their demodulation capabilities of their transceivers so as to accommodate the optimized data streams.

It will be recognized that while MU-MIMO cases involving two or three UEs are described above, the logic and methodologies of the invention can be extended to any number of UEs.

Moreover, while a transmitter-driven signaling model is described herein (i.e., an eNB or UE transmitter performing the determination of time-frequency or other resources that would be required for the asymmetric data streams, and then signaling a prospective receiver as to the resource allocation selected), the invention may be practiced in a receiver-driven mode. For example, the receiver in the foregoing scenario might instigate a request for or "pull" of data streams from the transmitter, including a proposed allocation for the streams in terms of time frequency resources. The transmitter can then service this request, taking into account the receiver's proposed allocation scheme. This approach may be useful, inter alia, in cases where the receiver is limited in its available resource configuration or capacity.

Apparatus—

Figure 10:
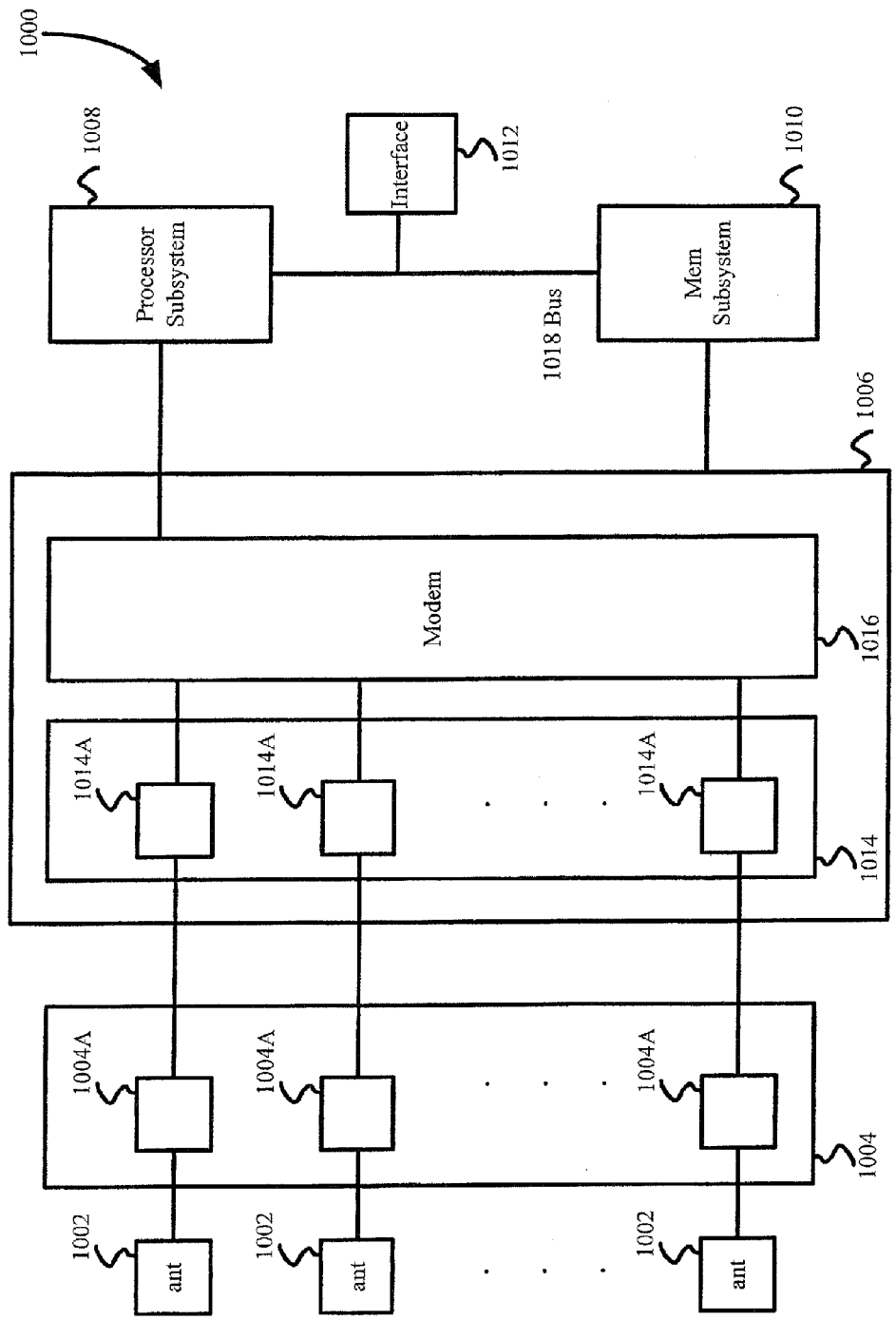
FIG. 10 is a functional block diagram illustrating a first exemplary multiple-antenna apparatus manufactured in accordance with the principles of the present invention.

Referring now to FIG. 10, exemplary apparatus 1000 useful in implementing the methods of the present invention are illustrated. The apparatus 1000 may for instance comprise UE, Base Station Controller (BSC) or eNB. The exemplary apparatus of invention is a multiple antenna transceiver system 1000, comprising multiple antennas 1002, an RF to analog baseband subsystem 1004, a digital baseband subsystem 1006, a processor subsystem 1008, a memory subsystem 1010, and an interface subsystem 1012. These components may be integrated together, or further partitioned. Furthermore, while the discussion of these components is for a commercial embodiment of a full duplex system (i.e. receive and transmit operations occur simultaneously), a half duplex, or simplex system is also anticipated, as asymmetric antenna management is not substantively different.

The multiple antennas 1002 and RF subsystem 1004 comprise the necessary hardware components for antenna transmission. Various algorithms may be implemented in either hardware or software 1004A (e.g. power control, automatic gain control, and automatic frequency control) which govern the operation of the antenna to optimize spectral efficiency, and power consumption. The RF to analog baseband 1004 is connected to the digital baseband 1006. In one embodiment, the RF front-end 1004 is subdivided into a plurality of discrete front-ends, each interfacing to a separate antenna subsystem 1002. In another embodiment, a single RF front-end is implemented, which manages the plurality of antenna subsystems collectively.

The digital baseband 1006 comprises a modem subsystem 1016 and antenna specific digital hardware or software algorithm 1014 (e.g. IFFT, and or FFT components). In one embodiment, the antenna specific digital hardware or software algorithm 1014A directly interfaces to one of a plurality of discrete RF subsystems. In another embodiment, the antenna specific digital hardware 1014 directly interfaces to a single RF subsystem.

Asymmetry of antenna data streams can only be determined with reference to multiple antennas. Therefore, in one embodiment of the present invention, wherein a single RF subsystem 1004 manages multiple antennas 1002, the RF subsystem 1004 must be able to detect the data stream rates across the plurality of antennas 1002 and feed rate information back to the digital modem subsystem 1006. In another embodiment of the present implementation, wherein a plurality of discrete RF subsystems exist to individually manage a corresponding plurality of antenna subsystems 1002, the data rate detection across multiple antenna subsystems is managed internally within the digital modem 1016.

A processor subsystem 1008 governs the operation of the modem subsystem. The processor subsystem 1008 may comprise e.g., a processor, cache memory and DMA. The processor subsystem 1008 is connected to the digital modem subsystem 1006, and may also be connected to the RF to Analog Baseband subsection 1004. The processor subsystem 1008 may also be connected to the memory subsystem 1010 and interface subsystem 1012 via a bus 1018. The memory subsystem 1010 provides access to computer-readable storage media.

The interface subsystem 1012 provides external access to the data being transmitted and or received. In the embodiment of a mobile phone, this may comprise an LCD display, keypad, microphone, speaker, or any of the other user interface devices well known in the arts. In other embodiments, the interface may comprise a network connection, or other form of interface (such as USB, Firewire, etc.)

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a transmitting device within a wireless system, said transmitting device having a plurality of antennas, the method comprising:
   receiving a plurality of data input streams;
   identifying a data rate asymmetry between at least two of said input streams; and
   reallocating time-frequency resources based at least in part on said identified data rate asymmetry;
   wherein a significance of the asymmetry is determined using an algorithm which dynamically evaluates a quantity of the asymmetry as a function of other system parameters.

2. The method of claim 1, wherein the system comprises a 3G cellular system, a 4G cellular system, or a 4G LTE cellular system.

3. The method of claim 1, wherein the transmitting device comprises a base station.

4. The method of claim 1, wherein the transmitting device comprises a mobile user device.

5. The method of claim 1, wherein the plurality of antennas utilize a multi-input, multi-output (MIMO) system.

6. The method of claim 1, wherein the transmitting device is adapted to transmit at least one of the plurality of data input streams using orthogonal frequency division multiplexing (OFDM).

7. The method of claim 1, wherein the reallocating is further based in part on the amount of data to be transmitted on each data stream for an upcoming transmission instant.

8. The method of claim 1, wherein a further significance of the asymmetry is determined via a comparison to a predetermined threshold.

9. A method of doing business within a wireless network having a plurality of subscribers, the method comprising:
   providing a first subset of said subscribers with first user devices having a first time-frequency resource allocation scheme, said first user devices having associated therewith a first fee or cost; and
   providing a second subset of said subscribers with second user devices having a second time-frequency resource allocation scheme, said second user devices having associated therewith a second fee or cost;
   wherein said second fee or cost is greater than said first fee or cost, and said second user devices are more battery power-efficient than said first user devices, said more battery power-efficiency being related at least in part to said second time-frequency resource allocation scheme, wherein said second time-frequency resource allocation scheme comprises:
      determining an asymmetry in the time-frequency resource requirements of two data streams to be transmitted by one of said second user devices; and
      allocating subcarriers within an OFDM modulator so as to avoid unnecessary use of at least some of said subcarriers and processing resources associated therewith
      wherein a significance of the asymmetry is determined using an algorithm which dynamically evaluates a quantity of the asymmetry as a function of other system parameters.

10. Apparatus for use in a wireless communications network, the apparatus comprising:
    a non-transitory memory comprising a set of instructions; and
    a processor executing the set of instructions to perform operations comprising:
       receiving a plurality of data input streams;
       identifying a data rate asymmetry between at least two of said input streams; and
       reallocating time-frequency resources based at least in part on said identified data rate asymmetry,
       wherein a significance of the asymmetry is determined using an algorithm which dynamically evaluates a quantity of the asymmetry as a function of other system parameters.

11. The apparatus of claim 10, wherein the network comprises a 3G cellular system, a 4G cellular system, or a 4G LTE cellular system.

12. The apparatus of claim 10, wherein the apparatus comprises a base station.

13. The apparatus of claim 10, wherein the apparatus comprises a mobile user device.

14. The apparatus of claim 10, wherein the apparatus is adapted to transmit at least one of the plurality of data input streams using orthogonal frequency division multiplexing (OFDM).

15. The apparatus of claim 10, wherein the reallocating is further based in part on the amount of data to be transmitted on each data stream for an upcoming transmission instant.

16. The apparatus of claim 10, wherein a further significance of the asymmetry is determined via a comparison to a predetermined threshold.

\* \* \* \* \*